C. ARDUSER.
TIRE SHOE.
APPLICATION FILED APR. 7, 1917.
1,316,757. Patented Sept. 23, 1919.
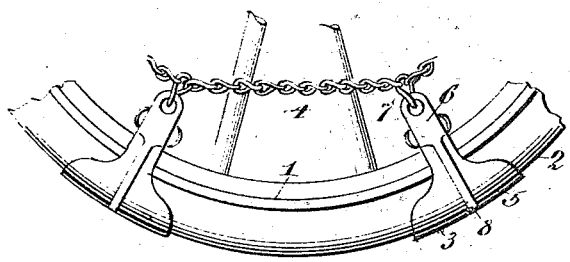
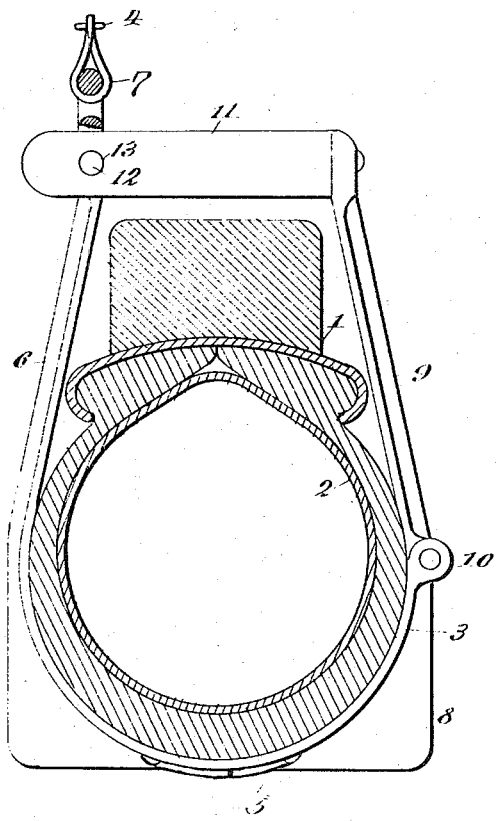
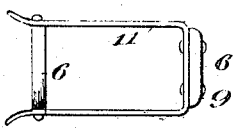

UNITED STATES PATENT OFFICE.

CHRIS ARDUSER, OF COGGON, IOWA.

TIRE-SHOE.

1,316,757.  Specification of Letters Patent.  Patented Sept. 23, 1919.

Application filed April 7, 1917. Serial No. 160,555.

*To all whom it may concern:*

Be it known that I, CHRIS ARDUSER, a citizen of the United States, residing at Coggon, in the county of Linn and State of Iowa, have invented certain new and useful Improvements in Tire-Shoes; and I do hereby declare the following to be a full, clear, and exact description of the invention, such as will enable others skilled in the art to which it appertains to make and use the same.

This invention relates to traction shoes for automobile tires, and has for its object to produce a shoe which may be attached to a tire in position on a wheel without jacking up the wheel, and when attached is adapted to afford a firm and tenacious hold on the road, but without the jar incident to tires shod with chains or armor having radially projecting teeth or spurs.

In the accompanying drawing, forming a part of this specification, Figure 1 is a side view illustrating a portion of my improved shoe, as in use. Fig. 2 is a view of the same transverse to the tire. Fig. 3 is a view of the latching stirrup and the inner ends of the connecting radial arms of the shoe, the outer portion of the shoe not being shown in this view.

In the drawing, the numeral 1 designates the rim, and 2 the tire of an ordinary automobile wheel. Seated on the tire is a series of shoes 3, connected on one side of the wheel by a chain 4. Considered singly, the shoe is formed with a broad tread portion 5, which conforms to the curvature of the tire. This tread portion conforms to the outer curvature of a segment of the tire, embracing, as to a cross-section of the tire, and as shown in Fig. 2, a little more than half of the circumference. Its inner end is pierced, as shown in Fig. 1, to receive a link 7, whereby the series of shoes is coupled to the chain 4. Near this inner end the arm is provided with lateral studs 12, which serve to lock the shoe in position on the tire, as will be explained presently. The middle of the shoe is provided with flanges 8, whose opposite edges are practically parallel, the other edges being practically at right angles thereto, and flush with the tread of the shoe. These flanges therefore bear but little, or not at all on the surface of a hard street, but the side flanges serve as traction wings in mud or sand.

To the side of the shoe opposite the radial arm 6 is hinged another radial arm 9, the hinge being shown at 10, Fig. 2. To the outer end of this arm is riveted a stirrup 11, of some slightly elastic material, such as spring steel. Near the outwardly turned ends of the stirrup-legs are holes 13, which register with the studs 12 above mentioned. The shoe may thus be secured in position on the tire by first turning back this hinged arm to admit the tire, and finally be fastened in place by swinging the arm back to the position shown in Fig. 2 and Fig. 3, the perforated legs of the stirrup snapping over the studs. Even should the connecting chain break, the shoes cannot escape from their connection with the wheel. The construction also admits of the whole series of shoes being attached to the wheel while resting on the ground, inasmuch as there is but one connecting chain, on but one side of the wheel, and the individual shoes may be separately opened and closed at will.

Having thus described my invention, I claim:

A tire-shoe, comprising a tread portion, an integral arm extending radially inward from said tread portion at one side, its end pierced to receive a chain link, and having lateral, stirrup-engaging studs near said end, and an arm hinged to the opposite side of the tread portion, and having an elastic stirrup at its free end to engage said studs.

In testimony whereof I affix my signature in presence of two witnesses.

CHRIS ARDUSER.

Witnesses:
  EMMA G. SUFFICOOL,
  BRUCE ARDUSER.